Figure 1:
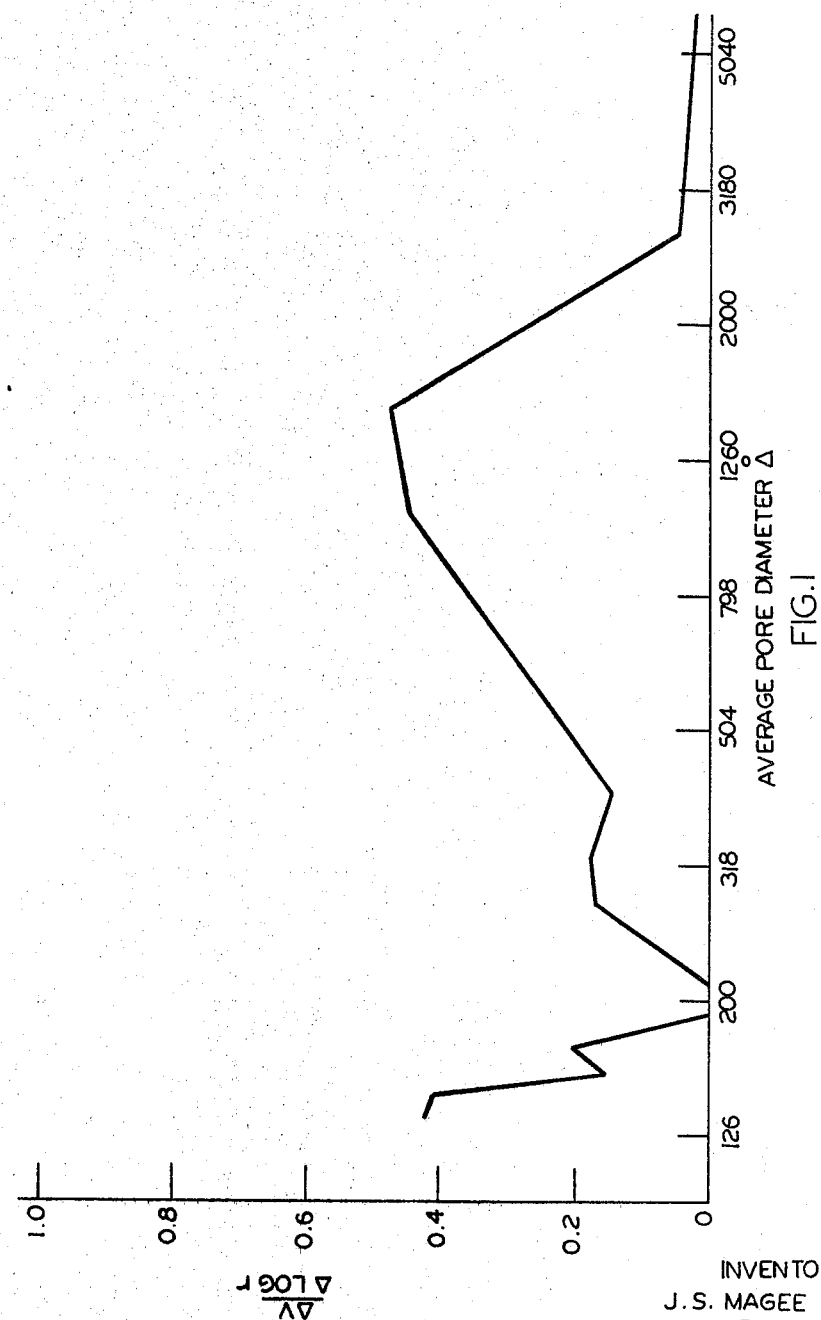

May 30, 1967     J. S. MAGEE ETAL     3,322,494
PROCESS FOR PREPARING ALUMINA HAVING A NARROW
PORE SIZE DISTRIBUTION
Filed June 2, 1964     3 Sheets-Sheet 1

INVENTORS
J. S. MAGEE
W. S. BRIGGS
BY
ATTORNEY

May 30, 1967

J. S. MAGEE ETAL 3,322,494

PROCESS FOR PREPARING ALUMINA HAVING A NARROW
POR E SIZE DISTRIBUTION

Filed June 2, 1964

3 Sheets-Sheet 3

INVENTORS
J.S. MAGEE
W.S. BRIGGS
BY Joseph P. Nigon
ATTORNEY

United States Patent Office 3,322,494
Patented May 30, 1967

3,322,494
PROCESS FOR PREPARING ALUMINA HAVING A NARROW PORE SIZE DISTRIBUTION
John S. Magee, Baltimore, and Warren S. Briggs, Silver Spring, Md., assignors to W. R. Grace & Co., New York, N.Y., a corporation of Connecticut
Filed June 2, 1964, Ser. No. 371,928
1 Claim. (Cl. 23—143)

This invention relates to the preparation of alumina. Specifically, it relates to a process for preparing alumina in a specific and controllable pore size distribution range.

Aluminas have many applications, for example, as selective adsorbents, catalytsts and catalyst supports. For many of these applications, it is desirable to have a product with a narrow pore size distribution range. Hydrous alumina, or alumina gel, is generally formed by adding ammonia or alkali to a suitable aluminum salt. The porosity characteristics of the alumina are determined somewhat by the method of preparation. The products generally have an extremely wide pore size distribution range and with many of the pores smaller than 150 A. In the past, efforts to prepare aluminas in a narrow pore size distribution range have amounted to "after-treatment" of the material prepared by standard techniques. That is, the prepared material has been subjected to some treatment whereby certain pores are eliminated. This treatment causes elimination of the small pores but with a concurrent loss of alumina, often as high as 10%.

We have discovered a method whereby alumina can be prepared having a narrow pore size distribution within the broad range of from 1,000 to 2,000 Angstroms. Our method involves no after-treatment. The material as prepared in our process has the desired pore size distribution range without further treatment. Pore size range is controlled by incorporation of a water insoluble polymer in the product during gelation which is subsequently removed through calcination. The maximum pore size is around a single value within the broad range of 1,000 to 2,000 A.

Briefly, the process consists of preparing an aluminum salt solution, adding a small amount of microcrystalline cellulose to an ammonia solution, mixing the ammonia and aluminum salt solutions, aging the mixture, filtering to remove the precipitate, drying, calcining and recovering the product alumina.

We have found that by incorporating cellulose in the alumina during gelation, it is possible to prepare a final product having a controlled pore size. The pore size is determined somewhat by the particle size of the polymer. Particle sizes of the added polymer of about 150 to 300 A. consistently gave an alumina product having a pore size distribution in the range of 1000 to 2000 A. To obtain a narrow pore size distribution in the product it is necessary to add only a small amount of the polymer. Addition of a large amount of the polymer (i.e., greater than the weight of $Al_2O_3$ present) tends to result in a product having a broad pore size distribution range. Therefore, about 15 to 70% of polymer, based on the amount of $Al_2O_3$ present, is sufficient to prepare the product of our invention. The type of microcrystalline aggregates of cellulose used range in diameter from 150–300 A. up to about 50,000 A. and are rodlike in shape. Polymer used in this invention has been fully described by O. A. Battista and P. A. Smith, Ind. and End. Chem., 54, 20–49 (1962).

The first step in the process consists of preparing the aluminum salt solution. In our process, we use aluminum nitrate. Substitution of aluminum sulfate led to a product which did not have the desired pore diameter distribution. The solution is prepared to contain 28 grams per liter of aluminum (as aluminum oxide).

A 2.2 molar ammonium hydroxide solution is then prepared. About 15 to 70% of microcrystalline cellulose, based on the weight of $Al_2O_3$ present, is added to the solution.

The aluminum nitrate solution is added rapidly and with stirring to the ammonia. The mixture is aged for about 16 to 20 hours at ambient temperature. The precipitate is then separated from excess solution, dried for about 20 to 30 hours at 110° C., and finally calcined at 650° C. for 4 to 8 hours.

The porosity characteristics of our product were determined by measuring the mercury pore volume. The mercury pore volume is obtained by forcing mercury into the pores. Mercury is forced into different size pores depending on the pressure exerted. Thus, at 100 p.s.i. absolute pressure, mercury can be forced into pores having a diameter above about 17,500 Angstroms. As the pore size decreases, the amount of pressure required to force mercury into the pores increases. The method is described in detail by H. L. Ritter and L. C. Drake, Ind. End. Chem. Anal. Ed., 17, 787 (1945). The mercury pore volume data reported on our products were measured at pressures from 0 to 15,000 p.s.i. using a standard mercury porosimeter.

Our invention will be further explained by the following specific but non-limiting examples.

*Example I*

This run illustrates a typical preparation of our product using about 15% polymer based on the weight of $Al_2O_3$ present.

A total of 50 gms. of $Al(NO_3)_3 \cdot 9H_2O$ was dissolved in deionized water to make 250 ml. of solution.

One gram of microcrystalline cellulose having a particle size of 150 to 300 A. was dispersed in one liter of solution containing 150 ml. of concentrated $NH_4OH$ (28% $NH_3$).

The two solutions were mixed rapidly and stirred for about ten minutes. The mixture was allowed to age for 16 hours and dried for 24 hours at 110° C. Finally, the product was calcined for five hours at 650° C.

The mercury pore volume, determined by the method previously described, was 0.322 cc./g. The maximum pore diameter distribution curve is shown in FIGURE 1.

$$\frac{\Delta V}{\Delta \log r}$$

in the figure represents the change in pore volume divided by the change in log of the pore radius. The maximum peak occurs at about 1500 Angstroms which represents the average pore diameter of our product.

*Example II*

The effect of 70% polymer additive (based on the weight of alumina) upon the porosity characteristics of our product is demonstrated in this run.

Fifty grams of aluminum nitrate were dissolved in deionized water to make 250 ml. of solution.

A total of 5 grams of microcrystalline cellulose (particle size 150–300 A.) was dispersed in one liter of a solution containing 150 milliliters of concentrated ammonium hydroxide (28% $NH_3$). The two solutions were mixed rapidly and stirred for about ten minutes. The mixture was allowed to age for 16 hours, dried for 24 hours at 110° C. and finally calcined for five hours at 650° C. The mercury pore volume of the alumina product was 0.604 cc./g. The average pore diameter of the product was about 1500 A. It can be seen that the higher percentage of polymer produces a product in which the total mercury pore volume is about twice that of the product of Example I, but has essentially no effect on the average pore diameter of the product.

Example III

In this run, alumina was prepared by the same technique as described in Examples I and II, but without the polymer additive.

50 grams of $Al(NO_3)_3 \cdot 9H_2O$ were dissolved in deionized water to make 250 ml. of solution. An ammonia solution was prepared by diluting 150 ml. of concentrated $NH_4OH$ (28% $NH_3$) to one liter.

The two solutions were mixed rapidly and stirred for about 10 minutes. The mixture was allowed to age for 16 hours. The precipitate was separated from excess solution and dried for 24 hours at 110° C. Finally, the alumina product was calcined for five hours at 650° C.

Figure 2:
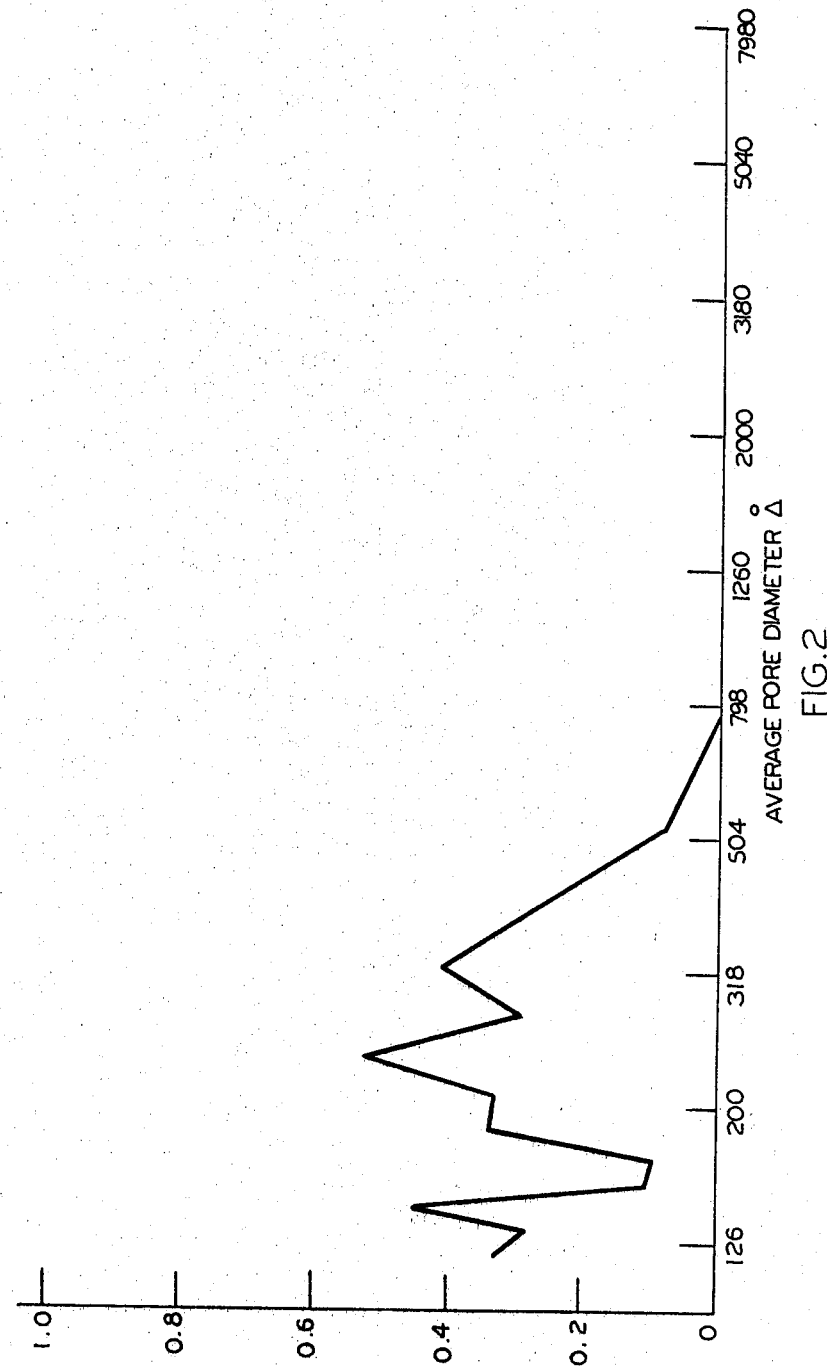

The total mercury pore volume of the product was 0.190 cc./g. The pore diameter distribution as shown in FIGURE 2 is about 200 A. These results show that a product having the maximum pore diameter distribution in the range of our product is not prepared when the polymer is eliminated from the process.

Example IV

This example shows the type product which is prepared when an amount of polymer greater than the amount of alumina present is used in our process.

A total of 50 grams of $Al(NO_3)_3 \cdot 9H_2O$ was dissolved in sufficient deionized water to make 250 ml. of solution.

50 grams of microcrystalline cellulose having a particle size of 150–300 A. were dispersed in one liter of a solution containing 150 milliliters of concentrated ammonium hydroxide (28% $NH_3$).

The two solutions were mixed rapidly, stirred for 10 minutes then aged for 16 hours at ambient temperature. The precipitate was separated from excess solution, dried for 24 hours at 110° C. and finally calcined for 5 hours at 650° C.

Figure 3:
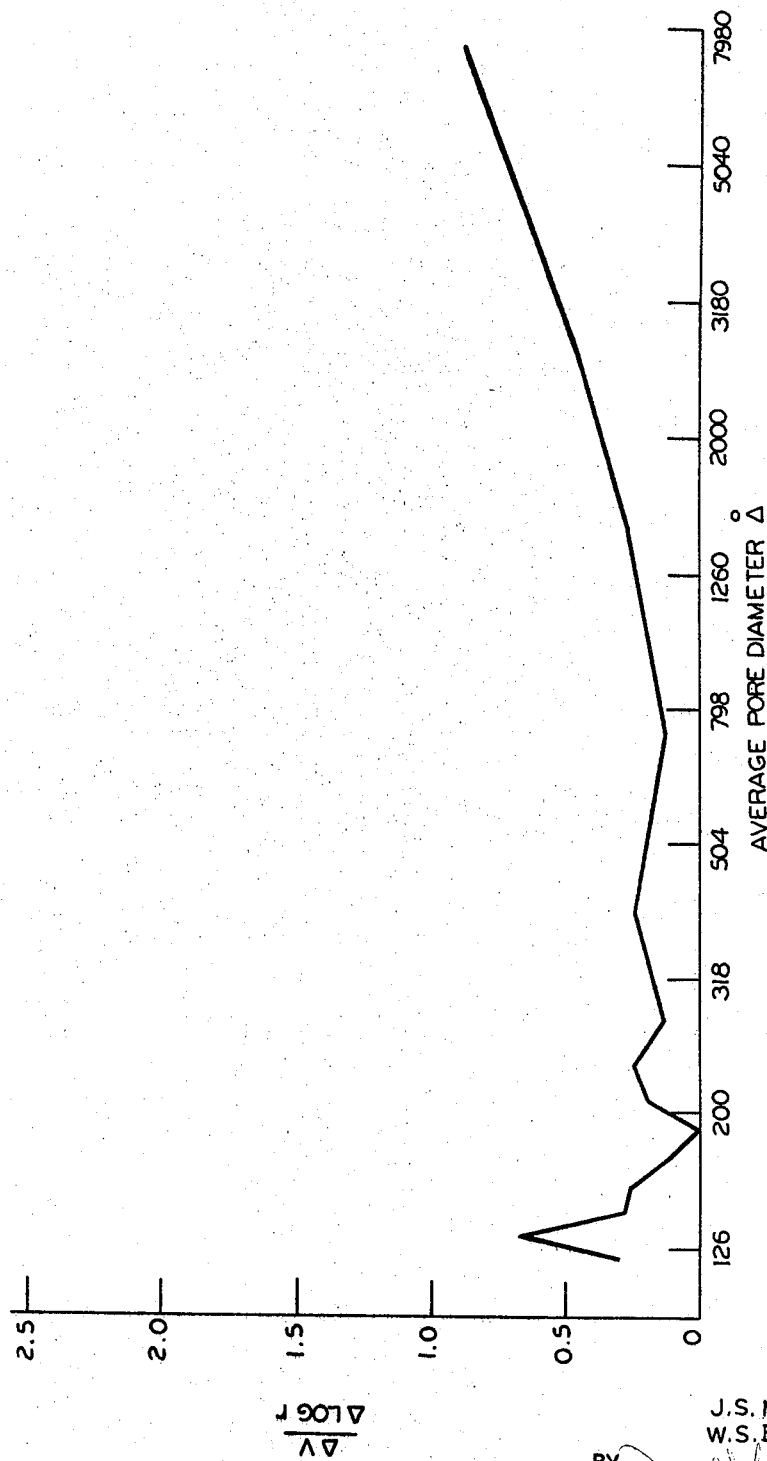

The mercury pore volume of the product was 2.77 cc./g. The pore diameter distribution is shown in FIGURE 3. It can be seen that the large amount of polymer (in relation to alumina present) gives a product with a broad pore diameter distribution in contrast to the sharp distribution of the product prepared by our process. In addition, no peak in the distribution curve is observed in the range above 500 A. pore diameter.

What is claimed is:

A process for preparing alumina having a narrow pore size distribution within the range of 1000 to 2000 Angstroms which comprises preparing an aluminum nitrate solution containing 28 grams per liter of aluminum calculated as aluminum oxide, preparing a 2.2 molar ammonia solution in which is dispersed 15 to 70% of microcrystalline cellulose, based on the amount of $Al_2O_3$ present, having a particle size of about 150–300 A., adding said aluminum nitrate solution to said ammonia solution to precipitate aluminum hydroxide, aging the mixture for 16 to 20 hours, separating the precipitate from excess solution, drying for 20 to 30 hours at 110° C., calcining at 650° C., for 4 to 8 hours, and finally recovering the alumina product.

References Cited

UNITED STATES PATENTS

| | | | |
|---|---|---|---|
| 2,166,868 | 7/1939 | Jones | 23—143 X |
| 2,211,745 | 8/1940 | Stephenson | 23—143 X |
| 2,697,066 | 12/1954 | Sieg. | |
| 3,193,349 | 7/1965 | Mooi | 23—143 |

OSCAR R. VERTIZ, *Primary Examiner.*

H. T. CARTER, *Assistant Examiner.*